US010795143B2

(12) United States Patent
Hauger et al.

(10) Patent No.: US 10,795,143 B2
(45) Date of Patent: Oct. 6, 2020

(54) MICROSCOPY SYSTEM AND MICROSCOPY METHOD FOR RECORDING FLUORESCENCE IMAGES AND WHITE-LIGHT IMAGES

(71) Applicant: Carl Zeiss Meditec AG, Jena (DE)

(72) Inventors: Christoph Hauger, Aalen (DE); Marco Wilzbach, Aalen (DE)

(73) Assignee: Carl Zeiss Meditec AG, Jena (DE)

(*) Notice: Subject to any disclaimer, the term of this patent is extended or adjusted under 35 U.S.C. 154(b) by 119 days.

(21) Appl. No.: 16/013,606

(22) Filed: Jun. 20, 2018

(65) Prior Publication Data

US 2018/0364470 A1 Dec. 20, 2018

(30) Foreign Application Priority Data

Jun. 20, 2017 (DE) .................... 10 2017 210 274

(51) Int. Cl.
| | |
|---|---|
| G02B 21/36 | (2006.01) |
| G02B 21/22 | (2006.01) |
| G01N 21/64 | (2006.01) |
| G02B 21/00 | (2006.01) |
| G02B 21/06 | (2006.01) |

(Continued)

(52) U.S. Cl.
CPC ....... G02B 21/361 (2013.01); G01N 21/6458 (2013.01); G02B 21/0012 (2013.01); G02B 21/06 (2013.01); G02B 21/16 (2013.01); G02B 21/22 (2013.01); G02B 27/1013 (2013.01); *G01N 2021/6471* (2013.01)

(58) Field of Classification Search
CPC .............. G02B 21/361; G02B 21/6458; G02B 21/0012; G02B 21/06; G02B 21/16; G02B 21/22; G02B 27/1013; G01N 2021/6471

USPC ......................................................... 359/385
See application file for complete search history.

(56) References Cited

U.S. PATENT DOCUMENTS

2010/0110538 A1* 5/2010 Steffen ................... G02B 21/16
359/363
2012/0248333 A1* 10/2012 Fallert ................ A61B 1/00186
250/458.1

FOREIGN PATENT DOCUMENTS

| DE | 10 2015 216 570 A1 | 11/2016 |
|---|---|---|
| DE | 10 2015 011 429 A1 | 3/2017 |
| DE | 10 2015 011 441 A1 | 3/2017 |

(Continued)

OTHER PUBLICATIONS

German Office Action, with English-language translation thereof, issued in German counterpart application No. DE 10 2017 210 274.8 dated Jan. 16, 2018.

*Primary Examiner* — Collin X Beatty
(74) *Attorney, Agent, or Firm* — Falk Ewers; Ewers IP Law PLLC

(57) ABSTRACT

A microscopy system and a microscopy method for recording a fluorescence image and a white-light image are disclosed. An exemplary microscopy system includes an illumination apparatus for illuminating an object region and for exciting at least one fluorescent dye, an optical unit for imaging the object region onto at least one fluorescence image detector and at least one white-light image detector. A beam splitter and a filter are arranged in the beam path provided by the optical unit and configured such that substantially only fluorescence emitted by the fluorescent dyes is incident on the fluorescence image detector and an image that is as color-neutral as possible is recorded by the white-light image detector.

17 Claims, 4 Drawing Sheets

(51) Int. Cl.
  *G02B 21/16* (2006.01)
  *G02B 27/10* (2006.01)

(56) References Cited

FOREIGN PATENT DOCUMENTS

| | | |
|---|---|---|
| DE | 10 2016 108 664 A1 | 7/2017 |
| EP | 2 505 989 A1 | 10/2012 |
| WO | 2007/085496 A1 | 8/2007 |

\* cited by examiner

MICROSCOPY SYSTEM AND MICROSCOPY METHOD FOR RECORDING FLUORESCENCE IMAGES AND WHITE-LIGHT IMAGES

CROSS REFERENCE TO RELATED APPLICATIONS

This application claims priority to German patent application DE 10 2017 210 274.8 filed on Jun. 20, 2017, which is hereby incorporated by reference in its entirety.

TECHNICAL FIELD

The present disclosure relates to microscopy systems and microscopy methods for recording fluorescence images and white-light images. Microscopes, in particular surgical microscopes, are often used for application in surgery, the microscopes being configured to detect fluorescence emitted by fluorescent dyes. By way of example, fluorescent dyes are used here to highlight certain tissue, cancer cells, for example, or liquids, specific constituents of blood, for example, in relation to the surroundings thereof.

BACKGROUND

The fluorescent dyes need to be excited in their excitation wavelength range for the fluorescent dyes to emit fluorescence. That is to say, fluorescent dyes need to be illuminated by light, the wavelength of which lies in the excitation wavelength range of the fluorescent dye, for the fluorescent dye to emit fluorescence.

Usually, the intensity of fluorescence is approximately 100 times to 1000 times lower than the intensity of illumination light reflected at a surface of the object provided with the fluorescent dye. Therefore, it is necessary to process the fluorescence, which is weak in comparison with the reflected illumination light, in such a way that it can be detected efficiently.

Conventionally, this is achieved by providing special illumination and detection filters for a specific fluorescent dye. The specially tuned detection filters often have the property of only transmitting light in the emission wavelength range of the specific fluorescent dye and of suppressing surrounding wavelength ranges. Therefore, the images obtained using such detection filters often only have one color, making it more difficult for the user to identify the content contained in the image and relate this with respect to the surroundings thereof.

Microscopy systems which solve this problem by alternately recording fluorescence images and white-light images by virtue of successively arranging the filters within and outside of the corresponding beam paths of the microscopy system are known. However, this is disadvantageous in that the user has to undertake the correlation between the provided image information items themselves. By way of example, this means that the surgeon must, in the white-light image, find the region that is identifiable as a tumour in the fluorescence image by comparison of the two images again in order to recognize where the tumour is situated in relation to its surroundings.

SUMMARY

It is an object of the present disclosure to provide microscopy systems and microscopy methods which overcome the disadvantages specified above.

The object is achieved by the exemplary embodiments of the microscopy systems and the exemplary embodiments microscopy methods disclosed herein.

According to an aspect of the present disclosure, a microscopy system for recording a white-light image and a fluorescence image is provided, wherein the microscopy system comprises: an illumination apparatus, which is configured to produce illumination light in an illumination light wavelength range EX and to direct the illumination light onto an object region; at least one image detection unit, which comprises a fluorescence image detector, a white-light image detector, and a beam splitter; an optical unit, which is configured to produce an observation beam path, which images the object region onto the fluorescence image detector and onto the white-light image detector of the at least one image detection unit.

The illumination apparatus can produce illumination light, which has a significant intensity, at least in the illumination light wavelength range EX, the intensity sufficing to excite fluorescent dyes that are arranged in the object region. The spectral component of the illumination light, which does not excite any fluorescent dye, i.e., the spectral component of the illumination light which lies outside of the excitation wavelength ranges of the fluorescent dyes, is reflected at an object, moreover containing the fluorescent dyes, that is arranged in the object region and can be used for recording the white-light image. The spectral components of the illumination light which lie in the excitation wavelength range of the fluorescent dyes excite the fluorescent dyes. These excited fluorescent dyes emit fluorescence, which can be used for recording the fluorescence image.

At least one image detection unit is provided for recording the white-light image and the fluorescence image. Each of the at least one image detection units comprises one or more fluorescence image detectors, one or more white-light image detectors and one or more beam splitters.

The fluorescence image detector is configured to detect light in the emission wavelength range of at least one fluorescent dye in a spatially resolved manner. The at least one fluorescence image detector can output a signal which represents an intensity distribution of light incident on the fluorescence image detector, i.e., a fluorescence image.

The at least one white-light image detector is configured to detect light in the wavelength range of white light, for example in the wavelength range of visible light. The at least one white-light image detector can output a signal which represents an intensity distribution of light incident on the white-light image detector, i.e., a white-light image.

By way of example, the at least one white-light image detector can be embodied as an RGB camera or as a camera with a Bayer pattern. By way of example, the fluorescence image detector can be an (RGB+IR) camera or a monochromatic image detector, i.e., an image detector, which is configured to detect light in a narrow wavelength range. By way of example, the monochromatic image detector can have a bandwidth of 5 nm, 10 nm, 50 nm or 100 nm.

For the purposes of imaging the object region onto the at least one fluorescence image detector and onto the at least one white-light image detector, provision is made of an optical unit. By way of example, the optical unit can comprise an objective lens, a zoom system, and further optical elements. The optical unit is configured to provide an observation beam path which images the object region onto the detectors such that an optical image of the object region is produced on the detectors.

The optical unit can be configured to direct only fluorescence onto the at least one fluorescence image detector and to direct light that is not fluorescence onto the at least one white-light image detector.

According to an exemplary embodiment, the illumination apparatus comprises a light source, which is configured to produce the illumination light in the illumination light wavelength range EX. Alternatively, the illumination apparatus can comprise a light source and at least one illumination filter that is used to produce the illumination light, the at least one illumination filter being arrangeable in an illumination light beam path between the light source and the object region and being configured to transmit light of the illumination light wavelength range EX and to suppress light outside of the illumination light wavelength range EX.

In this exemplary embodiment, the light source can produce light in the illumination light wavelength range EX, which can be directed onto the object region. By way of example, the light source can be a broadband light source, which produces light in the wavelength range of visible light and, optionally, in the infrared range. By way of example, a xenon light source can be used as a broadband light source. If use is made of such a broadband light source, the illumination light is produced with the aid of the at least one illumination filter by virtue of the light produced by the light source being filtered by the at least one illumination filter.

A wavelength range of a filter is considered to be transmissive if the mean transmittance in this wavelength range is at least 0.1, in particular at least 0.5, further particularly at least 0.9 or 0.99. A wavelength range of a filter can be considered to be suppressed if the mean transmittance in this wavelength range is at most 0.1, in particular 0.01 or further particularly 0.001. As is conventional in the technology sector, the transmittance can be defined as a quotient of the intensity of the light passing through the filter to the intensity of the light of the same wavelength that is incident on the filter.

Typically, the illumination filter is configured to transmit light of the illumination light wavelength range EX and to suppress light of a wavelength range that is substantially complementary to the illumination light wavelength range EX.

A wavelength range that is complementary to a first wavelength range is a wavelength range that consists of the wavelength range from 400 nm to 1000 nm, with the first wavelength range being removed therefrom.

By way of example, the illumination apparatus can comprise a plurality of illumination filters, which can be arranged, optionally individually or in combination, in the illumination light beam path for producing the illumination light. The illumination filter destined to produce the illumination light can be introduced into the illumination light beam path and removed therefrom, for example, by an actuator, wherein the actuator is controlled by a controller.

According to an exemplary embodiment, the microscopy system comprises two image detection units, wherein the optical unit is configured to supply beams emanating from the object region to the two image detection units from different directions; and wherein the two image detection units each comprise a fluorescence image detector, a white-light image detector, and a beam splitter.

In this exemplary embodiment, the microscopy system is embodied as a stereo microscopy system. Here, the observation beam path comprises beams emanating from the object region in different directions, the beams respectively being supplied to one of the two image detection units such that images of the object region from a first direction can be recorded in the one image detection unit and images of the object region from a second direction can be recorded in the other image detection unit. Therefore, a total of two fluorescence images and two white-light images can be recorded simultaneously in this exemplary embodiment, wherein each of the two image detection units records one white-light image and one fluorescence image in each case.

According to a further exemplary embodiment, the fluorescence image detector, the white-light image detector and the beam splitter of one of the image detection units are contained together in a housing. That is to say, a housing is provided for each of the image detection units, the housing containing the fluorescence image detector, the white-light image detector and the beam splitter of this image detection unit.

Further, the optical unit is contained in an optical unit housing. The optical unit housing and the housing or housings containing the detectors and the beam splitters can be connected to one another, in particular in such a way that the optical unit images the object region onto the detectors.

According to a further exemplary embodiment, the optical unit is in an optical unit housing, which furthermore contains the beam splitters of the image detection units. The fluorescence image detector and the white-light image detector of each of the image detection units are contained in dedicated housings in each case. The optical unit housing and the housing or housings containing the detectors and the beam splitters can be connected to one another, in particular in such a way that the optical unit images the object region onto the detectors.

According to an exemplary embodiment, the beam splitter of the respective image detection unit is a dichroic beam splitter, which is configured to output light of a wavelength range PM to the fluorescence image detector of the respective image detection unit and to output light of a wavelength range, substantially complementary to the wavelength range PM, to the white-light image detector of the respective image detection unit.

In this exemplary embodiment, the two beam splitters of the two image detection units are embodied as dichroic beam splitters. As a result of this, the light guided in the observation beam path is spectrally separated into light of the wavelength range PM, which is output in a beam path to the fluorescence image detector (fluorescence beam path), and into light of a wavelength range that is substantially complementary to the wavelength range PM, which is output in a beam path to the white-light image detector (white-light beam path).

According to a further exemplary embodiment herein, the image detection units each further comprise an adjustment filter, which is arranged in the observation beam path between the beam splitter and the fluorescence image detector of the respective image detection unit and which is configured to transmit light of the wavelength range PM and to suppress light outside of the wavelength range PM. In particular, the adjustment filter of the respective image detection unit can be configured to suppress light of a wavelength range that is substantially complementary to the wavelength range PM.

Each of the two image detection units comprises an adjustment filter in this exemplary embodiment, the adjustment filter filtering the light that was output into the fluorescence beam path by the dichroic beam splitter. As a result of this, the spectral separation undertaken by the dichroic beam splitter is complemented by further filtering, as a result of which light outside of the wavelength range PM is suppressed in an improved manner.

According to a further exemplary embodiment, as an alternative to the dichroic beam splitter, the beam splitter of the respective image detection unit is configured to output light of substantially the same wavelength range to the fluorescence image detector and the white-light image detector of the respective image detection unit. As a result of this, the beam splitter functions as a conventional beam splitter which does not spectrally separate the light directed onto the beam splitter, but only splits the latter according to amplitudes or intensities.

In this exemplary embodiment, each of the image detection units further comprises an adjustment filter, which is arranged in the observation beam path between the beam splitter of the respective image detection unit and the fluorescence image detector of the respective image detection unit, i.e., in the fluorescence beam path, and which is configured to transmit light of a wavelength range PM and to suppress light outside of the wavelength range PM. In particular, the adjustment filter can be configured to suppress light in a wavelength range that is substantially complementary to the wavelength range PM.

In this exemplary embodiment, the effect of the dichroic beam splitter is obtained by a conventional beam splitter in conjunction with the adjustment filter. As a result of this, light of the wavelength range PM is not completely transmitted into the fluorescence beam path, as a result of which the fluorescence contained in the wavelength range PM is only incompletely directed onto the fluorescence image detector. However, this configuration of the image detection unit is simpler and therefore more cost-effective in relation to the configuration with the dichroic beam splitter.

According to a further exemplary embodiment, the microscopy system further comprises at least one observation filter, which is arrangeable in the observation beam path between the object region and the beam splitter of the respective image detection unit and which is configured to transmit light of a wavelength range EM and to suppress light outside of the wavelength range EM. In particular, the at least one observation filter can be configured to suppress light of a wavelength range that is substantially complementary to the wavelength range EM.

The at least one observation filter is arrangeable in the observation beam path between the object region and the beam splitter of the respective image detection unit, i.e., the at least one observation filter can be inserted into, and removed from, the observation beam path. The microscopy system can comprise one or more observation filters, which, alternatively, can be arranged individually or in combination in the observation beam path. By way of example, provision can be made of an actuator, which arranges the at least one observation filter in, and removes the at least one observation filter from, the observation beam path. By way of example, the actuator can be controlled by a controller.

Light reaching the fluorescence image detector passes through both the at least one observation filter and the dichroic beam splitter or the adjustment filter in this exemplary embodiment. Therefore, only light whose wavelength lies in the intersection of the wavelength range PM with the wavelength range EM reaches the fluorescence image detector of the respective image detection unit. These two degrees of freedom make it possible to set the microscopy system to a certain fluorescent dye while the demands on the individual filters or the dichroic beam splitter are reduced in respect of their transmission characteristics.

According to a further exemplary embodiment, the image detection unit further comprises at least one observation filter, which is arranged in the observation beam path between the beam splitter and the fluorescence image detector of the respective image detection unit, i.e., in the fluorescence beam path, and which is configured to transmit light of a wavelength range EM and to suppress light outside of the wavelength range EM. In particular, the at least one observation filter can be configured to suppress light in a wavelength range that is substantially complementary to the wavelength range EM.

According to a further exemplary embodiment herein, each of the image detection units further comprises a white-light filter, which is arranged in the observation beam path between the beam splitter and the white-light image detector of the respective image detection unit, i.e., in the white-light beam path, and which is configured to transmit light of the wavelength range of white light and to suppress light outside of the wavelength range of white light. In particular, the at least one white-light filter can be configured to suppress light in a wavelength range that is substantially complementary to the wavelength range of white light.

The wavelength range of white light comprises, e.g., a wavelength range from 400 nm to 800 nm, in particular a wavelength range from 400 nm to 750 nm. In particular, the wavelength range of white light, i.e., the wavelength range of visible light, can be restricted to these ranges, i.e., consist thereof.

The at least one white-light filter can suppress further ambient light, which is produced in surrounding wavelength ranges, for example by the illumination of the space in which the microscopy system is used.

In this exemplary embodiment, only light whose wavelength is contained in the intersection of the wavelength range of white light and of the wavelength range that is substantially complementary to the wavelength range PM reaches the white-light image detectors.

According to a further exemplary embodiment, the beam splitters are embodied as amplitude beam splitters as an alternative to the above-described configuration of the beam splitters as dichroic beam splitters; i.e., the beam splitters are configured to output light of substantially the same wavelength range to the fluorescence image detectors and to the white-light image detectors.

In this exemplary embodiment, each of the image detection units further comprises an adjustment filter, which is arranged in the observation beam path between the beam splitter and the fluorescence image detector of the respective image detection unit, i.e., in the fluorescence beam path, and which is configured to transmit light of a wavelength range PM and to suppress light outside of the wavelength range PM. In particular, the at least one adjustment filter can be configured to suppress light in a wavelength range that is substantially complementary to the wavelength range PM.

In this exemplary embodiment, the effect of the dichroic beam splitter is obtained by a conventional beam splitter in conjunction with the adjustment filter. As a result of this, light of the wavelength range PM is not completely transmitted into the fluorescence beam path, as a result of which the fluorescence contained in the wavelength range PM is only incompletely directed onto the fluorescence image detector. However, this configuration of the image detection unit is simpler and therefore more cost-effective in relation to the configuration with the dichroic beam splitter.

According to a further exemplary embodiment herein, each of the image detection units further comprises an observation filter, which is arranged in the observation beam path between the object region and the beam splitter of the respective image detection unit and which is configured to transmit light of a wavelength range EM and to suppress light outside of the wavelength range EM. In particular, the observation filter can be configured to suppress light in a wavelength range that is substantially complementary to the wavelength range EM.

According to a further exemplary embodiment herein, each of the image detection units further comprises at least one white-light filter, which is arranged in the observation beam path between the beam splitter and the white-light image detector of the respective image detection unit, i.e., in the white-light beam path, and which is configured to transmit light of a wavelength range of white light and to suppress light outside of the wavelength range of white light. In particular, the white-light filter can be configured to suppress light in a wavelength range that is substantially complementary to the wavelength range of white light. As described above, this can reduce the influence of ambient light.

Exemplary embodiments adapted to the protoporphyrin IX (PPIX) and indocyanine green (ICG) fluorescent dyes are described below.

The protoporphyrin IX fluorescent dye is substantially excitable in the wavelength range from 380 nm to 460 nm and emits fluorescence substantially in the wavelength range from 600 nm to 740 nm.

The indocyanine green fluorescent dye is substantially excitable in the wavelength range from 790 nm to 810 nm and emits fluorescence substantially in the wavelength range from 800 nm to 1000 nm.

According to an exemplary embodiment for recording a white-light image and a fluorescence image using the PPIX fluorescent dye, the illumination light wavelength range EX and the wavelength range PM are defined as follows: The illumination light wavelength range EX comprises the wavelength range from 400 nm to a first wavelength and the wavelength range PM comprises the wavelength range from the first wavelength to 900 nm, with the first wavelength lying in the range from 630 nm to 700 nm. Instead of comprising the corresponding wavelength ranges, the illumination light wavelength range EX and the wavelength range PM can be restricted to the corresponding wavelength ranges, i.e., consist thereof.

According to an exemplary embodiment for recording a white-light image and a fluorescence image using the ICG fluorescent dye, the illumination light wavelength range EX, the wavelength range PM and the wavelength range EM are defined as follows: The illumination light wavelength range EX comprises the wavelength range from 400 nm to 800 nm; the wavelength range PM comprises the wavelength range from a first wavelength to 900 nm; and the wavelength range EM comprises the wavelength range from 400 nm to the first wavelength and from 800 nm to 900 nm, with the first wavelength lying in the range from 630 nm to 700 nm. Instead of comprising the corresponding wavelength ranges, the illumination light wavelength range EX, the wavelength range PM and the wavelength range EM can be restricted to the corresponding wavelength ranges, i.e., consist thereof.

According to an exemplary embodiment for recording a white-light image and a fluorescence image using the ICG fluorescent dye, the illumination light wavelength range EX, the wavelength range PM and the wavelength range EM are defined as follows: The illumination light wavelength range EX comprises the wavelength range from 400 nm to 800 nm; the wavelength range PM comprises the wavelength range from a first wavelength to 900 nm; and the wavelength range EM comprises the wavelength range from 800 nm to 900 nm. Instead of comprising the corresponding wavelength ranges, the illumination light wavelength range EX, the wavelength range PM and the wavelength range EM can be restricted to the corresponding wavelength ranges, i.e., consist thereof.

For the purposes of detecting a plurality of different fluorescent dyes, which are arrangeable in the object region, the illumination light wavelength range EX, the wavelength range PM, and the wavelength range EM are set according to one exemplary embodiment as (a) $EX = (WL \setminus DM) \cup DX$, (b) $EM = WL \cup DM$, and (c) $PM = DM$, in which
WL represents a wavelength range of white light,
DM represents emission wavelength ranges of the fluorescent dyes and
DX represents excitation wavelength ranges of the fluorescent dyes.

Herein, the wavelength ranges EX, PM, and EM are defined in a formulation for the algebra of sets, where "$\cup$" represents the union of wavelength ranges and "$\setminus$" represents the complement of wavelength ranges.

"DM" represents the emission wavelength ranges of the fluorescent dyes, i.e., a wavelength range that emerges from the union of the emission wavelength ranges of the fluorescent dyes. "EX" represents excitation wavelength ranges of the fluorescent dyes, i.e., a wavelength range that emerges from the union of the excitation wavelength ranges of the fluorescent dyes.

Accordingly, the illumination light wavelength range EX emerges from the wavelength range of white light, from which the emission wavelength ranges of the fluorescent dyes have been excluded, in union with the excitation wavelength ranges of the fluorescent dyes. The wavelength range EM emerges from the union of the wavelength range of white light and the emission wavelength ranges of the fluorescent dyes. The wavelength range PM corresponds to the emission wavelength ranges of the fluorescent dyes.

In this way, the object region is substantially illuminated by visible light and light that can excite the fluorescent dyes. Here, the object region is not exposed to light of the emission wavelength ranges of the fluorescent dyes so that the illumination light does not swamp the fluorescence produced by the fluorescent dyes. Filtering by the observation filter, which transmits light in the wavelength range EM and suppresses light outside of the wavelength range EM, brings about a suppression of ambient light. As a result of the wavelength range PM corresponding to the emission wavelength ranges of the fluorescent dyes, only fluorescence is directed onto the fluorescence detector. This allows a fluorescence image to be recorded, which represents the intensity distribution of fluorescence incident on the fluorescence image detector, and it is possible to record a white-light image, which comprises light of the remaining usable visible spectrum. As a result of this, the white-light image has good color neutrality.

Even though the intensity of the fluorescence is significantly lower than the intensity of the light incident on the white-light image detector, this allows a separate white-light image and a separate fluorescence image to be recorded. Subsequently, these can be processed further by signalling means and can be presented in superposition such that the significantly different intensity can be compensated by post-processing of the images, as a result of which a superimposed image is produced, in which contents contained in the fluorescence image are visible in a well-delimited manner, in relation to the surroundings thereof, in the white-light image.

According to a further exemplary embodiment, the illumination apparatus is configured to produce illumination light with different illumination light wavelength ranges and to direct this successively onto the object region, wherein an illumination light wavelength range $EX_k$ is a k-th illumination light wavelength range of the different illumination light wavelength ranges.

By way of example, the illumination apparatus comprises a light source and a plurality of illumination filters with the n (n is a natural number greater than 1) different illumination light wavelength ranges $EX_k$, where k is an index for distinguishing the n illumination filters and the n illumination light wavelength ranges. The illumination filters can be arranged alternatively in the beam path between the light source and the object region. The k-th illumination filter is configured to transmit light in the illumination light wavelength range $EX_k$ and to suppress light of a wavelength range outside of the illumination light wavelength range $EX_k$. In this way, one (or more) illumination filter(s) or illumination light wavelength range(s) $EX_k$, which is/are matched to the respective fluorescent dye or a group of fluorescent dyes, can be provided for the plurality of fluorescent dyes that are arrangeable in the object region.

In this exemplary embodiment, the microscopy system further comprises n observation filters and the microscopy system is configured to arrange a k-th observation filter, corresponding to the k-th illumination light, in the observation beam path. An observation filter, which is arranged in the observation beam path when the k-th illumination light is produced in the illumination light wavelength range $EX_k$, is assigned to each of the n illumination light wavelength ranges $EX_k$, k=1, ..., n. In this way, a matching pair of illumination light and observation filter is used for analysing a fluorescent dye or a group of fluorescent dyes.

The k-th observation filter is configured to transmit light of a wavelength range $EM_k$ and to suppress light outside of the wavelength range $EM_k$. In particular, such an observation filter can be configured to suppress light of a wavelength range that is complementary to the wavelength range $EM_k$.

For the purposes of detecting the plurality of different fluorescent dyes that are arrangeable in the object region, the wavelength ranges $EX_k$, $EM_k$, and PM are set by:

(a) $EX_k = (WL \backslash DM_k) \cup DX_k$, (b) $EM_k = (WL \backslash DM) \cup DM_k$, and (c) $PM = DM$, in which
WL represents a wavelength range of white light,
$DM_k$ represents an emission wavelength range of the k-th fluorescent dye of the fluorescent dyes,
$DX_k$ represents an excitation wavelength range of the k-th fluorescent dye of the fluorescent dyes, and
EM represents emission wavelength ranges of the fluorescent dyes.

By producing an illumination light that is individually matched to each of the fluorescent dyes, it is possible to individually excite the fluorescent dyes in succession. During the excitation of a specific fluorescent dye, the observation filter corresponding thereto is arranged in the observation beam path such that only fluorescence of this fluorescent dye is guided onto the fluorescence image detector. The light guided onto the white-light image detector has the greatest possible usable visible spectral range here, as a result of which a good white-light impression is produced.

According to a further exemplary embodiment, the microscopy system comprises a plurality (n, n is a natural number greater than 1) of observation filters and the microscopy system is configured to arrange one of the observation filters in the observation beam path, wherein respectively one of the observation filters (35) is configured to transmit light of respectively one wavelength range $EM_k$ and to suppress light outside of the wavelength range $EM_k$; and wherein, for detecting a plurality of different fluorescent dyes, which are arrangeable in the object region, the following applies:

(a) $EX = (WL \backslash DM) \cup DX$, (b) $EM_k = (WL \backslash DM) \cup DM_k$, and (c) $PM = DM$, in which
WL represents a wavelength range of white light,
DM represents emission wavelength ranges of the fluorescent dyes,
DX represents excitation wavelength ranges of the fluorescent dyes and
$DM_k$ represents an emission wavelength range of the k-th fluorescent dye of the fluorescent dyes.

In this exemplary embodiment, the fluorescent dyes arranged in the object region are simultaneously excited by illumination with the illumination light in the illumination light wavelength range EX, but only the fluorescence of one of the fluorescent dyes is guided onto the fluorescence image detector by the plurality of observation filters, one of which is respectively arranged in the observation beam path. In this way, it is possible to selectively record fluorescence images of different fluorescent dyes, while the overview image comprises the greatest possible usable visible spectral range, as a result of which a good white-light impression is produced.

According to a further aspect, a microscopy method for recording fluorescence images and white-light images is provided, wherein the microscopy method comprises: exciting a plurality of fluorescent dyes arranged in an object region and illuminating the object region by producing and directing illumination light having at least one illumination light spectrum EX onto the object region; producing a beam path, which guides fluorescence produced by the fluorescent dyes and visible light emanating from the object region; spatially separating the beam path into a fluorescence beam path and a white-light beam path; imaging the object region into a fluorescence image plane via the beam path and the fluorescence beam path; and recording a fluorescence image of light guided in the fluorescence beam path in the fluorescence image plane; imaging the object region into a white-light image plane via the beam path and the white-light beam path; and recording a white-light image of light guided in the white-light beam path in the white-light image plane; suppressing the light guided to the fluorescence image plane in a wavelength range, which is substantially complementary to a wavelength range EM; and wherein either the spatial separation is implemented in such a way that light of a wavelength range PM, guided in the beam path, is transferred into the fluorescence beam path and that light of a wavelength range substantially complementary to the wavelength range PM, guided in the beam path, is transferred into the white-light beam path, or wherein the spatial separation is implemented in such a way that light of a wavelength range, guided in the beam path, is transferred into the fluorescence beam path and into the white-light beam path, and further suppressing the light, guided to the fluorescence image plane, in a wavelength range, which is substantially complementary to a wavelength range PM.

The microscopy method substantially describes the processes that are implementable with the microscopy systems described above. Therefore, the description of these exemplary embodiments is referred to in respect of individual details.

According to this microscopy method, a plurality of different fluorescent dyes, PPIX, ICG and fluorescein, for example, are arranged in an object region. These fluorescent dyes are excited and the object region is illuminated by virtue of illumination light being produced and directed onto the object region. To this end, illumination light with at least one illumination light spectrum EX is produced, i.e., illumination light with a certain illumination light spectrum or with a plurality of different illumination light spectra can be used for excitation and illumination purposes.

By way of example, provision can be made for the illumination light spectrum EX to be chosen in such a way that all fluorescent dyes arranged in the object region are excited at the same time. Alternatively, it is possible to use illumination light with a plurality of illumination light spectra $EX_k$, wherein each of the illumination light spectra $EX_k$ can excite a fluorescent dye, or a subset of the fluorescent dyes, arranged in the object region. In this way, it is possible to excite the individual fluorescent dyes or groups of fluorescent dyes in succession.

The fluorescent dyes arranged in the object region emit fluorescence when excited. As a result of illuminating the object region, light is reflected at the object region, the light being superimposed on the fluorescence. Here, as a rule, the intensity of the reflected light is many times higher than the intensity of the fluorescence. Both the fluorescence and the reflected light are guided in the beam path.

The beam path, which guides fluorescence and white light, i.e., light that differs from the fluorescence and is guided in the beam path, is spatially separated into a fluorescence beam path and a white-light beam path. The fluorescence beam path supplies part of the light guided in the beam path to a fluorescence image detector, for example, and the white-light beam path supplies light guided in the beam path to a white-light image detector, for example. By way of example, the spatial separation of the beam path can be brought about by a beam splitter.

Accordingly, the spatial separation can be implemented in such a way that light that is guided in the beam path is separated not only spatially but also according to wavelength ranges, i.e., spectrally. By way of example, this can be implemented by means of a dichroic beam splitter.

By way of example, the spatial separation can be implemented in such a way that light of a wavelength range PM, guided in the beam path, is transferred into the fluorescence beam path and that light of a wavelength range substantially complementary to the wavelength range PM, guided in the beam path, is transferred into the white-light beam path. This is referred to as dichroic separation.

As a result of this, the light guided in the beam path is spectrally separated. Therefore, wavelength ranges that are substantially complementary to one another are transferred into the fluorescence beam path and the white-light beam path.

Alternatively, the spatial separation can be implemented in such a way that light of one wavelength range guided in the beam path is transferred into the fluorescence beam path and into the white-light beam path. This spatial separation is referred to as separation according to amplitudes. This corresponds to the conventional separation of light beams. Hence, the light output into the fluorescence beam path and the white-light beam path has the same wavelength range, but possibly different amplitudes or intensities. By way of example, such a spatial separation can be implemented using a 50/50-splitter.

If the spatial separation is carried out according to the separation according to amplitudes, the microscopy method further comprises a suppression of the light guided to the fluorescence image plane in a wavelength range that is substantially complementary to a wavelength range PM. In combination with the spatial separation according to amplitudes, this causes light guided in the fluorescence beam path after the suppression to have the same spectral properties as the light output into the fluorescence beam path by means of the dichroic separation. In contrast hereto, the light output into the white-light beam path however additionally comprises fluorescence. However, this does not disturb the white-light image being recorded since the intensity of the fluorescence is significantly lower than the intensity in the other wavelength ranges.

The microscopy method further comprises imaging the object region into a fluorescence image plane via the beam path and the fluorescence beam path; and recording a fluorescence image of light guided in the fluorescence beam path in the fluorescence image plane. Further, the microscopy method comprises imaging the object region into a white-light image plane via the beam path and the white-light beam path; and recording a white-light image of light guided in the white-light beam path in the white-light image plane.

By imaging the object region into the fluorescence image plane and the white-light image plane, an optical image of the object region is produced in these planes, the optical image being recorded. By way of example, imaging can be undertaken by means of an optical unit, which may comprise an objective lens, a zoom system, and further optical elements, for example. The fluorescence images and white-light images recorded in this manner can subsequently be processed by signalling means. By way of example, these images can be optimized and superimposed on one another for presentation purposes such that the fluorescence image is presented with good contrast and with good delimitation from the white-light image.

Further, the microscopy method comprises suppressing the light guided to the fluorescence image plane in a wavelength range, which is substantially complementary to a wavelength range EM. By way of example, the suppression can be realized by way of a filter which transmits light in the wavelength range EM and suppresses light outside of the wavelength range EM.

As a result of the microscopy method described above, only light whose wavelength is contained in an intersection of the wavelength ranges EM and PM is imaged into the fluorescence image plane.

If the spatial separation is carried out by the dichroic separation, only light whose wavelength lies in a wavelength range that is substantially complementary to the wavelength range PM is imaged into the white-light image plane.

The suppression of the light guided to the fluorescence image plane can be carried out before or after the spatial separation. If the spatial separation is carried out according to the separation according to amplitudes and the suppression of the light guided to the fluorescence image plane is carried out before the spatial separation, i.e., in the beam path, only light whose wavelength lies in the intersection of the wavelength range EM and the wavelength range substantially complementary to the wavelength range PM is imaged into the white-light image plane.

If the spatial separation is carried out according to the separation according to amplitudes and the suppression of the light guided to the fluorescence image plane is carried out after the spatial separation, i.e., in the fluorescence beam path, light whose wavelength lies in the wavelength range PM is additionally imaged into the white-light image plane.

The following applies according to an exemplary embodiment:

$$EX=(WL \backslash DM) \cup DX,$$

$$EM=WL \cup DM, \text{ and}$$

$$PM=DM,$$

in which
WL represents a wavelength range of white light,
DM represents emission wavelength ranges of the fluorescent dyes, and
DX represents excitation wavelength ranges of the fluorescent dyes.

In this exemplary embodiment, all fluorescent dyes arranged in the object region are excited simultaneously. The fluorescence emitted by the fluorescent dyes is imaged into the fluorescence image plane. Light of the wavelength range that is substantially complementary to the wavelength range PM, i.e., light that is not fluorescence, is not imaged into the fluorescence image plane. This produces a fluorescence image that only represents fluorescence. Moreover, the white-light image has a good white-light impression.

According to an exemplary embodiment, exciting the plurality of fluorescent dyes arranged in the object region and illuminating the object region comprises: successively directing illumination light with different illumination light spectra onto the object region, wherein an illumination light spectrum $EX_k$ is a k-th illumination light spectrum of the various illumination light spectra; and wherein suppressing the light guided to the fluorescence image plane comprises: successively suppressing the light, guided to the fluorescence image plane, in different wavelength ranges, wherein, while the illumination light with the illumination light spectrum $EX_k$ is directed onto the object region, the light guided to the fluorescence image plane is suppressed in a wavelength range, which is substantially complementary to a wavelength range $EM_k$ of the different wavelength ranges. Here:

$$EX_k=(WL \backslash DM_k) \cup DX_k,$$

$$EM_k=(WL \backslash DM) \cup DM_k, \text{ and}$$

$$PM=DM,$$

in which
WL represents a wavelength range of white light,
$DM_k$ represents an emission wavelength range of the k-th fluorescent dye of the fluorescent dyes,
$DX_k$ represents an excitation wavelength range of the k-th fluorescent dye of the fluorescent dyes, and
DM represents emission wavelength ranges of the fluorescent dyes.

In this exemplary embodiment, the object region is illuminated by illumination light with a plurality of different illumination light spectra. If n different fluorescent dyes are arranged in the object region, it is possible to use, for example, n illumination light spectra $EX_k$, k=1, . . . , n for illumination and excitation purposes. Here, the object region is successively exposed by one of the n different illumination light spectra $EX_k$, and so one of or a subset of the n fluorescent dyes can be excited according to the configuration of the illumination light spectrum $EX_k$.

Corresponding wavelength ranges, in which the light guided to the fluorescence image plane is filtered, are provided for the various illumination light spectra. By way of example, it is possible to set n wavelength ranges, wherein the wavelength range $EM_k$ denotes the k-th wavelength range of these various wavelength ranges and can be used together with the light of the illumination light spectrum $EX_k$. By way of example, this configuration can be realized by filter wheels and corresponding filters arranged in the observation beam path and the beam path/fluorescence beam path.

By way of example, the index k denotes a subset of then different fluorescent dyes, i.e., for example, one or more, but not all, of the different fluorescent dyes arranged in the object region.

As a result of the configuration of the illumination light wavelength range $EX_k$ according to this exemplary embodiment, the object region is substantially illuminated by visible light and light in the excitation wavelength range of the k-th fluorescent dye, with only the emission range of the k-th fluorescent dye being omitted. As a result of the configuration of the wavelength range $EM_k$ and the wavelength range PM, only light whose wavelength lies in the emission wavelength range $DM_k$ of the k-th fluorescent dye, i.e., only the fluorescence of the excited fluorescent dye/dyes, is transmitted to the fluorescence image plane. The white-light image plane is substantially supplied with visible light outside of the emission wavelength ranges of the excited fluorescent dyes, and so the white-light image has a good white-light impression.

According to a further exemplary embodiment, suppressing the light guided to the fluorescence image plane comprises:

successively suppressing the light, guided to the fluorescence image plane, in different wavelength ranges, wherein the light guided to the fluorescence image plane is suppressed in a wavelength range, which is substantially complementary to a wavelength range $EM_k$, wherein the following applies:

$$EX=(WL \backslash DM) \cup DX,$$

$$EM_k=(WL \backslash DM) \cup DM_k, \text{ and}$$

$$PM=DM,$$

in which
WL represents a wavelength range of white light,
DM represents emission wavelength ranges of the fluorescent dyes,
DX represents excitation wavelength ranges of the fluorescent dyes, and
$DM_k$ represents an emission wavelength range of the k-th fluorescent dye of the fluorescent dyes.

In this exemplary embodiment, the fluorescent dyes arranged in the object region are excited simultaneously with light of the illumination light spectrum EX. Moreover, the object region is illuminated with visible light. Only the emission wavelength ranges DM of the fluorescent dyes are omitted. The light guided to the fluorescence image plane for recording the fluorescence image is successively filtered in different wavelength ranges. To this end, light is successively suppressed in different wavelength ranges. Light of the wavelength range $EM_k$ is transmitted into the fluorescence image plane while light in the wavelength range complementary to the wavelength range $EM_k$ is suppressed.

As a result of the configuration of the wavelength ranges $EM_k$ and the wavelength range PM, only light whose wavelength lies in the emission wavelength range of the k-th fluorescent dye is transmitted to the fluorescence image plane. In this way, it is therefore possible to selectively record fluorescence images for the different fluorescent dyes or groups thereof.

As described in conjunction with other exemplary embodiments, suppressing the light guided to the fluorescence image plane can be undertaken in the beam path, i.e., before the spatial separation, or in the fluorescence beam path, i.e., after the spatial separation.

According to a further exemplary embodiment, the microscopy method further comprises suppressing light, guided in the white-light beam path, in a wavelength range outside of a wavelength range of white light. As a result of this, ambient light, for example, is filtered out of the light guided to the white-light image plane, as a result of which the white-light image recorded in this manner is improved.

According to a further exemplary embodiment, the light guided in the fluorescence beam path is suppressed in a wavelength range, which is substantially complementary to the wavelength range PM. As a result of this, the fluorescence image recorded in this manner is improved.

BRIEF DESCRIPTION OF THE DRAWINGS

The disclosure will now be described with reference to the drawings wherein.

DESCRIPTION OF EXEMPLARY EMBODIMENTS

Exemplary embodiments of the present disclosure will be described below with reference to the figures. Elements denoted by the same reference sign in different exemplary embodiments are identical and reference is made to the corresponding description in the other exemplary embodiments.

Figure 1:
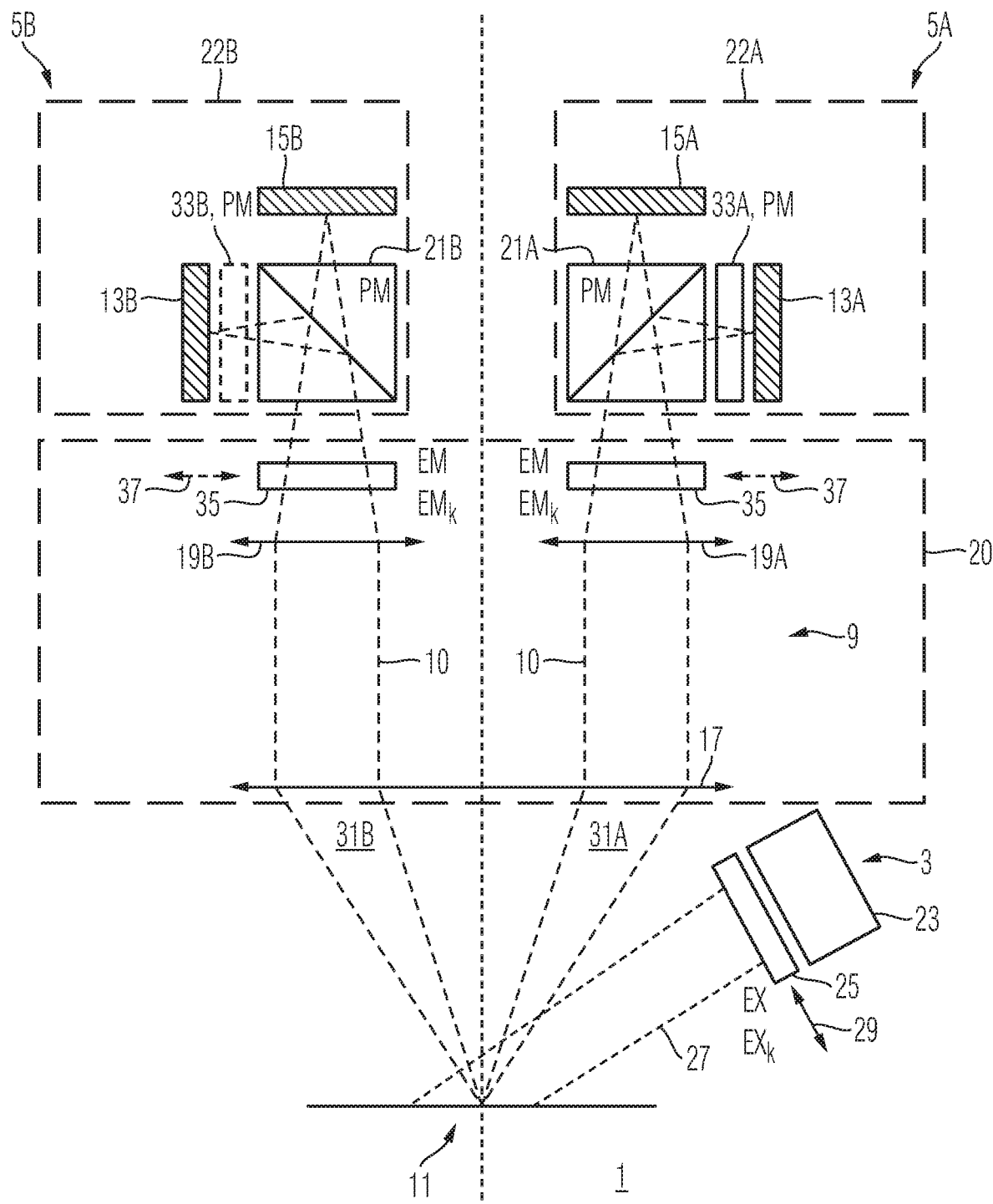
FIG. 1 shows a first exemplary embodiment of a microscopy system.

FIG. 1 shows a first exemplary embodiment of a microscopy system 1 for recording a white-light image and a fluorescence image. The microscopy system 1 comprises an illumination apparatus 3 and two image detection units 5A and 5B with the same configuration. Each of the image detection units 5A, 5B comprises a fluorescence image detector 13A, 13B, a white-light image detector 15A, 15B and a beam splitter 21A, 21B. The microscopy system 1 further comprises an optical unit 9, which provides an observation beam path 10 and which is configured to image an object region 11 onto the fluorescence image detectors 13A and 13B contained in the image detection units 5A and 5B, respectively. Further, the optical unit is configured to image the object region 11 onto the white-light image detectors 15A and 15B contained in the image detection units 5A and 5B, respectively. In the exemplary embodiment shown in FIG. 1, the optical unit 9 comprises an objective lens 17 and lens elements 19A and 19B.

The optical unit 9 is contained in an optical unit housing 20, which is illustrated by a dashed rectangle. The optical unit housing 20 has apertures or passage regions so that light can enter into and emerge from the optical unit.

The fluorescence image detector 13A, the white-light image detector 15A and the beam splitter 21A, which form the first image detection unit 5A, are contained together in a first housing 22A. The first housing 22A is illustrated by a dashed rectangle. In the same way, the fluorescence image detector 13B, the white-light image detector 15B and the beam splitter 21B, which form the second image detection unit 5B, are contained together in a second housing 22B. The first housing 22A and the second housing 22B have apertures or passage regions so that light from the optical unit can enter into the image detection units.

The first housing 22A and the second housing 22B can be connected to the optical unit housing 20 in such a way that the optical unit 9 images the object region 11 onto the detectors 13A, 15A and 13B, 15B.

Using this configuration, image detection units can be easily and quickly replaced, without complicated and time-consuming adjustments being necessary. Moreover, image detection units can be optimized for certain applications.

The illumination apparatus 3 comprises a light source 23 and an illumination filter 25, which is arrangeable in an illumination light beam path 27 between the light source 23 and the object region 11. As symbolized by the arrow 29, the illumination filter 25 can be inserted into, and removed from, the illumination light beam path 27. To this end, the microscopy system 1 can comprise an actuator, which is controlled by a controller, for example.

The illumination light filter 25 is configured to transmit light of an illumination light wavelength range EX and to suppress light outside of the illumination light wavelength range EX.

Alternatively, the illumination apparatus 3 can comprise a plurality of illumination filters 25, which are arrangeable, individually or in combination, in the illumination light beam path 27. The illumination light wavelength range, which is transmitted by a k-th of these plurality of illumination filters, is denoted by $EX_k$, where k is a sequential index for distinguishing the plurality of illumination filters 25.

As an alternative to the configuration of the illumination apparatus 3 just described above, the illumination apparatus can have a configuration by means of which the illumination apparatus 3 is configured to produce the illumination light with the illumination light wavelength range EX or with the illumination light wavelength ranges $EX_k$.

The microscopy system 1 is embodied as a stereoscopic microscope. That is to say, the optical unit 9 is configured to supply beams 31A and 31B to the two image detection units 5A and 5B, respectively, the beams emanating from the object region 11 from different directions. The beam 31A is supplied to the image detection unit 5A by the optical unit 9 such that the object region 11 is imaged onto the fluorescence image detector 13A and the white-light image detector 15A of the image detection unit 5A. The beam 31B is supplied to the image detection unit 5B by the optical unit 9 such that the object region 11 is imaged onto the fluorescence image detector 13B and the white-light image detector 15B of the image detection unit 5B.

In the microscopy system 1, the beam splitters 21A and 21B are embodied as dichroic beam splitters, i.e., each of the beam splitters 21A and 21B is configured to output light of a wavelength range PM to the fluorescence image detector of the respective image detection unit, i.e., into a fluorescence beam path, and output light of a wavelength range that is substantially complementary to the wavelength range PM to the white-light image detector of the respective image detection unit, i.e., into a white-light beam path. Light contained in the beam 31A with a wavelength within the wavelength range PM is therefore transferred by way of the dichroic beam splitter 21A toward the output of the beam splitter 21A at which the fluorescence image detector 13A is arranged. Light contained in the beam 31A with a wavelength outside of the wavelength range PM is output by way of the dichroic beam splitter 21A to the output of the beam splitter 21A at which the white-light image detector 15A is arranged. The dichroic beam splitter 21B is configured in the same way.

The image detection units 5A and 5B each comprise an adjustment filter 33A and 33B, respectively, which is arranged in the fluorescence beam path between the beam splitter and the fluorescence image detector of the respective image detection unit 5A, and 5B, respectively. The adjustment filter is configured to transmit light of the wavelength range PM and to suppress light outside of the wavelength range PM. As a result of this, the light that was already separated by the dichroic beam splitter and that was directed toward the fluorescence image detector is filtered again, as a result of which the recording of the fluorescence image is improved.

The microscopy system 1 further comprises an observation filter 35, which is arranged in the observation beam path 10, in particular between the object region 11 and the beam splitters 21A and 21B. As indicated by the arrows 37, the observation filter 35 can be inserted into, and removed from, the observation beam path 10. By way of example, this can be effected by an actuator, which is controlled by a controller.

The observation filter 35 is configured to transmit light of a wavelength range EM and to suppress light outside of the wavelength range EM.

Alternatively, the microscopy system 1 can comprise a plurality of observation filters 35. Each of the plurality of observation filters 35 is configured to transmit different wavelength ranges. The individual observation filters are distinguished by their sequential index k, and so the k-th observation filter is configured to transmit light of a wavelength range $EM_k$ and to suppress light outside of the wavelength range $EM_k$. The plurality of observation filters 35 can be selectively arranged individually or in combination in the observation beam path 10.

The microscopy system 1 can comprise a controller that is configured to control the illumination apparatus 3 and to selectively arrange the observation filters 35 in such a way that illumination light with the illumination light wavelength range $EX_k$ is used together with the observation filter that is configured to transmit light of the wavelength range $EM_k$. By way of example, this can be realized by virtue of the plurality of illumination filters 25 and the plurality of observation filters 35 being arranged in a filter wheel in each case and the filter wheels being controlled in such a way that filters that match one another are simultaneously arranged in the illumination light beam path 27 and in the observation beam path 10, respectively.

Therefore, the microscopy system 1 is configured in such a way that only light whose wavelength is contained in an intersection of the wavelength ranges EM and PM, or $EM_k$ and PM, is incident on the fluorescence image detectors 13A and 13B. Only light whose wavelength is contained in the intersection of the wavelength range EM with the wavelength range that is complementary to the wavelength range PM is incident on the white-light image detectors.

Figure 2:
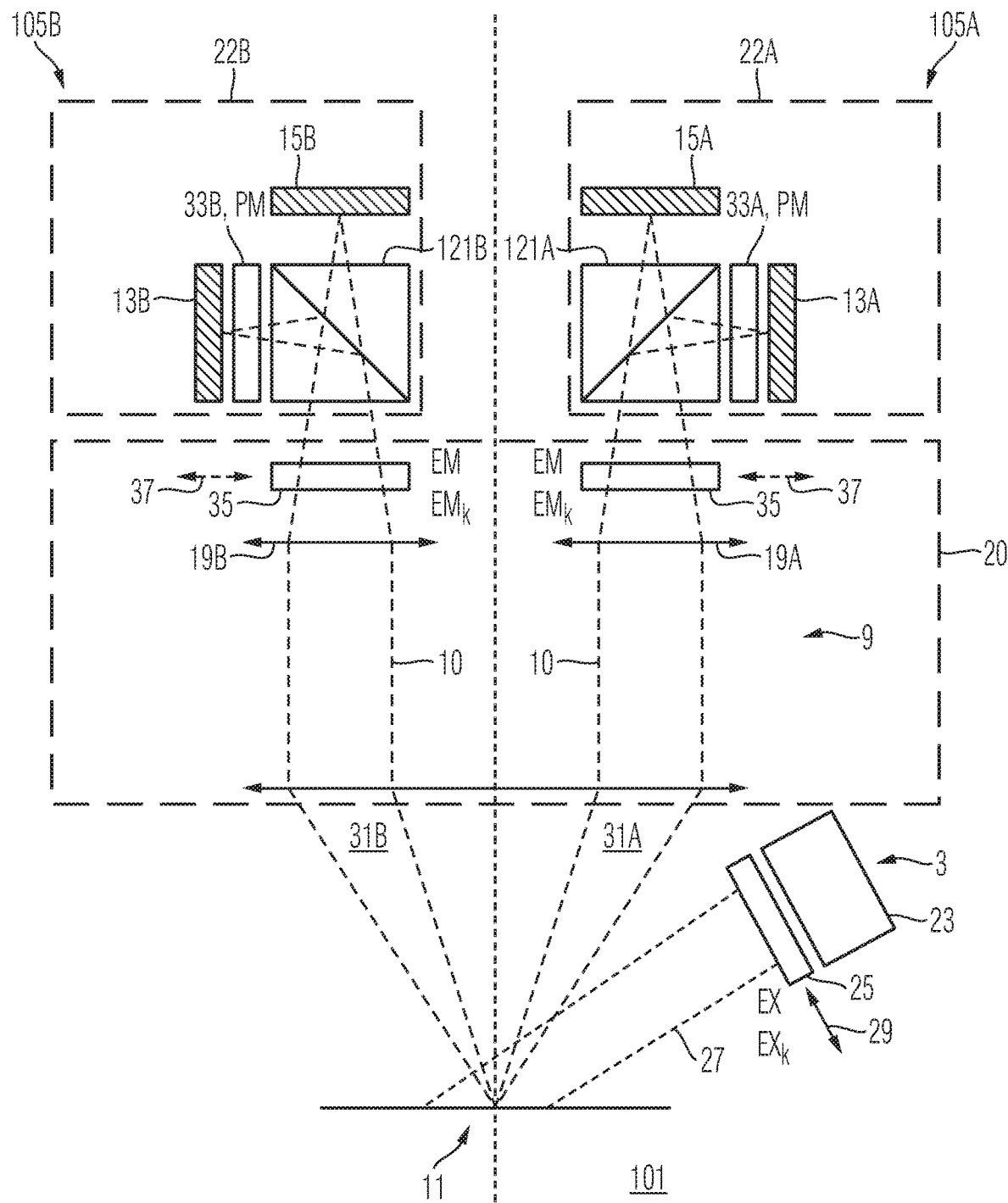
FIG. 2 shows a second exemplary embodiment of a microscopy system.

FIG. 2 shows a second exemplary embodiment of a microscopy system 101, which substantially differs from the first exemplary embodiment, shown in FIG. 1, in that the image detection units 105A and 105B comprise conventional amplitude beam splitters 121A and 121B in place of the dichroic beam splitters 21A and 21B and the image detection units 105A and 105B comprise the adjustment filters 33A and 33B.

The amplitude beam splitters 121A and 121B are each configured to output light of substantially the same wavelength range to the fluorescence image detector and the white-light image detector of the respective image detection units. That is to say, the amplitude beam splitter 121A or 121B divides the entering light only in terms of the intensity thereof and not spectrally, and so light of the same wavelength range, but possibly with different intensities, is output at the outputs of the respective beam splitter.

For the purposes of detecting fluorescence images for the PPIX and ICG fluorescent dyes and a white-light image, the microscopy system 1 and the microscopy system 101 can be configured according to the values of the following table:

|    | PPIX | ICG |
| --- | --- | --- |
| EX | 400 nm-λ | 400 nm-800 nm |
| PM |  | λ-900 nm |
| EM | — | 400 nm-λ and 800 nm-900 nm |
| λ |  | 630 nm-700 nm |

Figure 3:
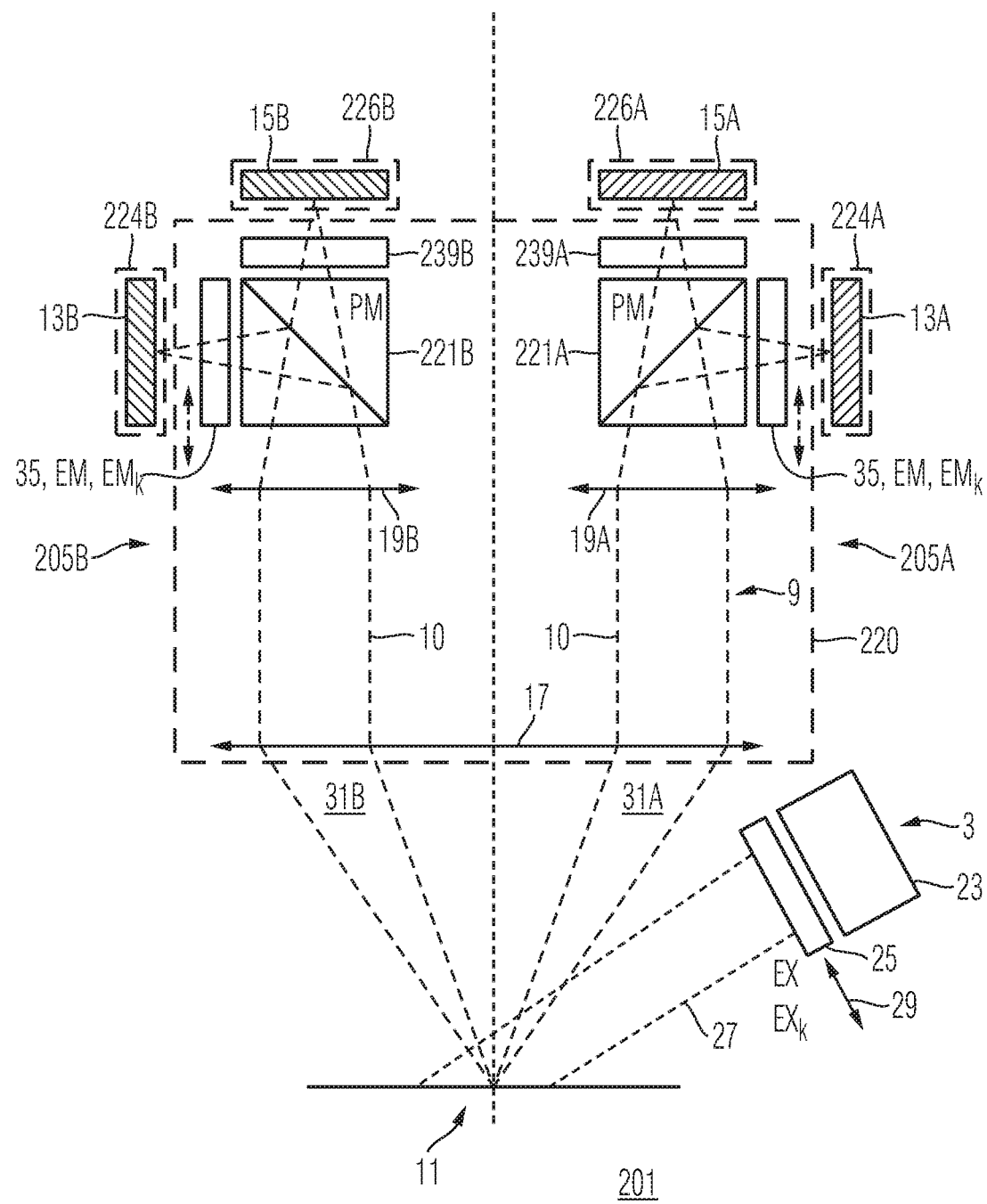
FIG. 3 shows a third exemplary embodiment of a microscopy system.

FIG. 3 shows a third exemplary embodiment of a microscopy system 201. The microscopy system 201 comprises the illumination apparatus 3, which is configured to direct illumination light of a wavelength range EX or $EX_k$ onto the object region 11.

The microscopy system 201 further comprises the optical unit 9, which provides an observation beam path 10. The microscopy system 201 further comprises two image detection units 205A and 205B, which respectively comprise the fluorescence image detectors 13A and 13B, the white-light image detectors 15A and 15B and the beam splitters 221A and 221B.

The fluorescence image detectors 13A and 13B are each contained in dedicated housings 224A and 224B, which are illustrated by dashed rectangles. The white-light image detectors 15A and 15B are each contained in dedicated housings 226A and 226B, which are illustrated by dashed rectangles. In particular, the beam splitters 221A, 221B and the optical unit 9 are arranged outside of the housings 224A, 224B, 226A, 226B. The housings 224A, 224B, 226A, 226B have apertures or passage regions so that light can be incident on the detectors 13A, 13B, 15A, 15B.

The optical unit 9 comprises the objective lens 17 and the lens elements 19A and 19B and the optical unit is configured to image the object region 11 onto the fluorescence image detectors 13A and 13B and onto the white-light image detectors 15A and 15B.

The optical unit 9 is contained in an optical unit housing 220, which is illustrated by a dashed rectangle. The optical unit housing 220 has apertures or passage regions so that light can enter into and emerge from the optical unit. The beam splitters 221A, 221B of the two image detection units 205A, 205B are likewise contained in the optical unit housing 220.

The housings 224A, 224B, 226A, 226B of the detectors 13A, 13B, 15A, 15B can be connected to the optical unit housing 220 in such a way that the optical unit 9 images the object region 11 onto the detectors 13A, 13B, 15A, 15B.

With this configuration, it is possible to use simple color cameras for detecting fluorescence and white-light images. The spectral separation of the light constituents emanating from the object region that is required to this end is implemented by the optical unit 9 and filters, which are arranged outside of the housings 224A, 224B, 226A, 226B, i.e., within the optical unit housing 220. Since conventional color image cameras can be used in this configuration, it is possible to provide a more cost-effective system.

The optical unit 9 produces two beams 31A and 31B, which emanate from the object region 11 from different directions, and supplies the beams to the image detection units 205A, 205B in the observation beam path 10. Therefore, the microscopy system 201 is likewise embodied as a stereo microscopy system.

The beam splitters 221A, 221B are embodied as dichroic beam splitters, which are each configured to output light of the wavelength range PM to the fluorescence image detectors 13A and 13B, respectively, and to output light of a wavelength range that is substantially complementary to the wavelength range PM to the white-light image detectors 15A and 15B, respectively.

The microscopy system 201 further comprises observation filters 35, which are arrangeable in the observation beam path 10 between the beam splitters 221A, 221B and the fluorescence image detectors 13A and 13B.

The observation filters 35 have substantially the same properties as the above-described observation filters. That is to say, the observation filters are configured to transmit light of a wavelength range EM or $EM_k$ and to suppress light outside of the wavelength range EM or $EM_k$.

The microscopy system 201 further comprises white-light filters 239A and 239B, which are arranged in the observation beam path between the beam splitters 221A, 221B and the white-light image detectors 15A and 15B. The white-light filters 239A and 239B are configured to transmit light of the wavelength range of white light and to suppress light outside of the wavelength range of white light. The wavelength range of white light comprises, e.g., the wavelength range from 400 nm to 750 nm or from 400 nm to 800 nm. The white-light filters 239A and 239B ensure that no ambient light can be incident on the white-light image detectors 15A and 15B.

As a result of the configuration of the microscopy system 201, only light emanating from the object region 11, whose wavelength is contained in the intersection of the wavelength ranges PM and EM, or PM and $EM_k$, is supplied to the fluorescence image detectors 13A and 13B. The white-light image detectors 15A and 15B are only supplied with that light emanating from the object region 11 whose wavelength lies in the intersection of the wavelength range of white light with the wavelength range that is substantially complementary to the wavelength range PM.

Figure 4:
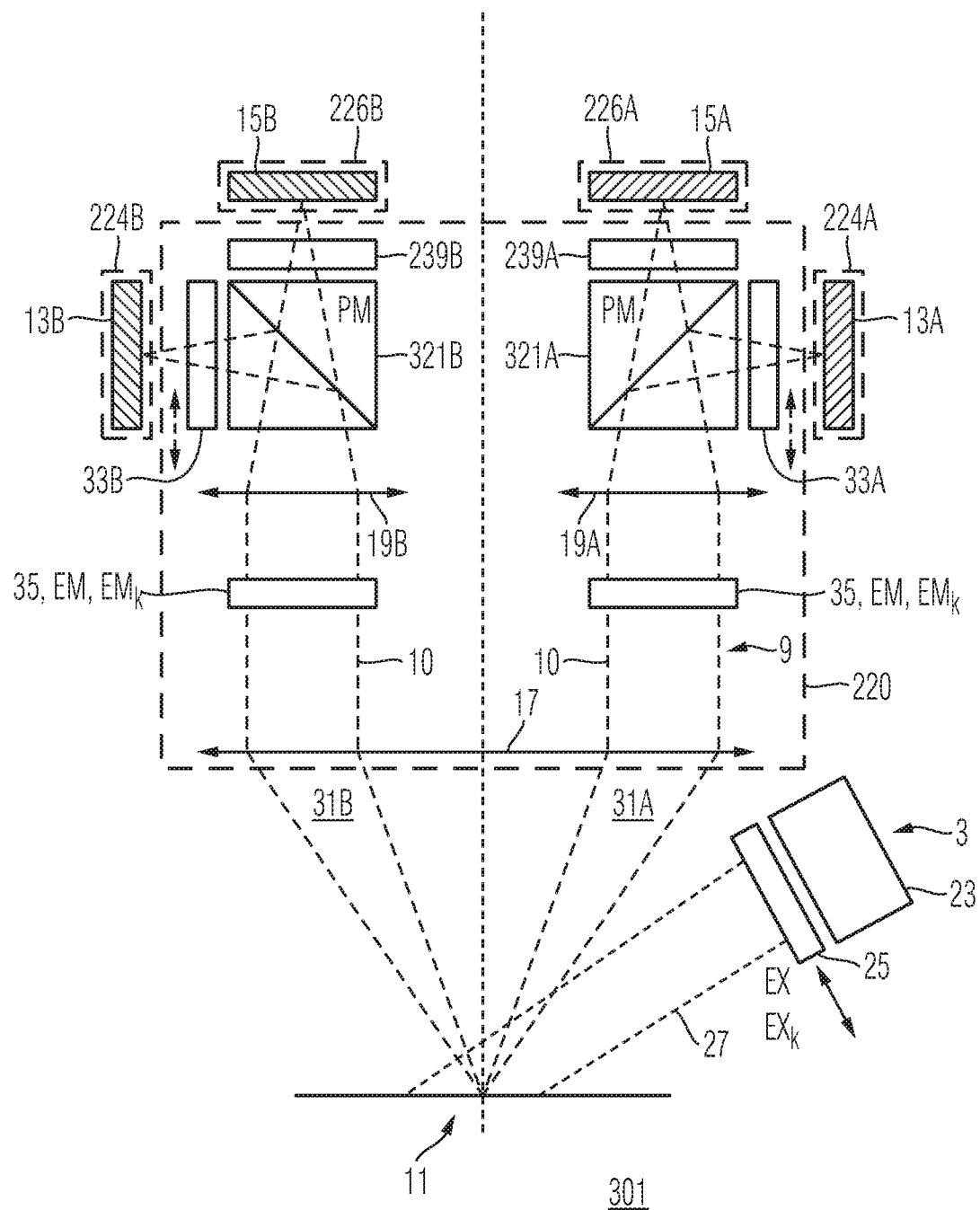
FIG. 4 shows a fourth exemplary embodiment of a microscopy system.

FIG. 4 shows a fourth exemplary embodiment of a microscopy system 301. The microscopy system 301 substantially differs from the microscopy system 201, shown in FIG. 3, in that the beam splitters 321A, 321B are not dichroic beam splitters but amplitude beam splitters and in that the microscopy system 301 comprises adjustment filters 33A and 33B, which are arranged in the observation beam path 10 between the amplitude beam splitters 321A, 321B and the fluorescence image detectors 13A and 13B.

The adjustment filters 33A and 33B are configured to transmit light of the wavelength range PM and to suppress light outside of the wavelength range PM.

The microscopy system 301 further comprises the observation filters 35, which are arranged in the observation beam path 10 between the object region 11 and the beam splitters 321A, 321B and which are configured to transmit light of a wavelength range EM or $EM_k$ and to suppress light outside of the wavelength range EM or $EM_k$.

For the purposes of detecting the PPIX and ICG fluorescent dyes, the microscopy systems 201 and 203 can be configured as illustrated in the table below:

|    | PPIX | ICG |
|----|------|-----|
| EX | 400 nm-λ | 400 nm-800 nm |
| PM |  | λ-900 nm |
| EM | — | 800 nm-900 nm |
| λ |  | 630 nm-700 nm |

The microscopy systems 1, 101, 201, and 301 can be used to carry out a microscopy method for recording fluorescence images and white-light images.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A microscopy method for recording fluorescence images and white-light images, the method comprising:
   simultaneously exciting a plurality of fluorescent dyes arranged in an object region and illuminating the object region by directing illumination light having at least one illumination light spectrum EX onto the object region;
   producing a common beam path to guide fluorescence produced by the fluorescent dyes and visible light emanating from the object region;
   spatially separating the common beam path into a fluorescence beam path and a white-light beam path;
   imaging the object region into a fluorescence image plane via the common beam path and the fluorescence beam path;
   recording a fluorescence image of fluorescence guided via the fluorescence beam path in the fluorescence image plane;
   imaging the object region into a white-light image plane via the common beam path and the white-light beam path;

recording a white-light image of the visible light guided via the white-light beam path in the white-light image plane;

suppressing light guided to the fluorescence image plane in a wavelength range that is substantially complementary to a wavelength range EM;

wherein either the spatial separation is implemented such that light of a wavelength range PM, guided in the common beam path, is transferred into the fluorescence beam path and that light of a wavelength range substantially complementary to the wavelength range PM, guided in the common beam path, is transferred into the white-light beam path, or wherein the spatial separation is implemented such that light of the wavelength range PM, guided in the common beam path, is transferred into the fluorescence beam path and into the white-light beam path, and light guided to the fluorescence image plane in a wavelength range, which is substantially complementary to the wavelength range PM, is suppressed; and wherein the following applies:

$$EX=(WL \setminus DM) \cup DX,$$

$$EM=WL \cup DM, \text{ and}$$

$$PM=DM,$$

wherein
WL represents a wavelength range of white light,
DM represents emission wavelength ranges of the fluorescent dyes, and
DX represents excitation wavelength ranges of the fluorescent dyes.

2. The microscopy method according to claim 1, wherein, if the spatial separation is implemented such that light of the wavelength range PM, guided in the common beam path, is transferred into the fluorescence beam path and that light of the wavelength range substantially complementary to the wavelength range PM, guided in the common beam path, is transferred into the white-light beam path, the microscopy method further comprises:

suppressing the light guided to the fluorescence image plane in a wavelength range, which is substantially complementary to the wavelength range EM, comprises:

suppressing the light guided in the fluorescence beam path in a wavelength range, which is substantially complementary to the wavelength range EM.

3. The microscopy method according to claim 1, further comprising:

suppressing light, guided in the white-light beam path, in a wavelength range outside of the wavelength range of white light.

4. The microscopy method according to claim 1, wherein, if the spatial separation is implemented such that light of the wavelength range PM, guided in the common beam path, is transferred into the fluorescence beam path and that light of the wavelength range substantially complementary to the wavelength range PM, guided in the common beam path, is transferred into the white-light beam path, the microscopy method further comprises:

suppressing the light guided in the fluorescence beam path in a wavelength range, which is substantially complementary to the wavelength range PM.

5. A microscopy method for recording fluorescence images and white-light images, the method comprising:

simultaneously exciting a plurality of fluorescent dyes arranged in an object region and illuminating the object region by directing illumination light having at least one illumination light spectrum EX onto the object region;

producing a common beam path to guide fluorescence produced by the fluorescent dyes and visible light emanating from the object region;

spatially separating the common beam path into a fluorescence beam path and a white-light beam path;

imaging the object region into a fluorescence image plane via the common beam path and the fluorescence beam path;

recording a fluorescence image of fluorescence guided via the fluorescence beam path in the fluorescence image plane;

imaging the object region into a white-light image plane via the common beam path and the white-light beam path;

recording a white-light image of the visible light guided via the white-light beam path in the white-light image plane;

suppressing light guided to the fluorescence image plane in a wavelength range that is substantially complementary to a wavelength range EM;

wherein either the spatial separation is implemented such that light of a wavelength range PM, guided in the common beam path, is transferred into the fluorescence beam path and that light of a wavelength range substantially complementary to the wavelength range PM, guided in the common beam path, is transferred into the white-light beam path, or wherein the spatial separation is implemented such that light of the wavelength range PM, guided in the common beam path, is transferred into the fluorescence beam path and into the white-light beam path, and light guided to the fluorescence image plane in a wavelength range, which is substantially complementary to the wavelength range PM, is suppressed;

wherein suppressing the light guided to the fluorescence image plane comprises:

successively suppressing the light, guided to the fluorescence image plane, in different wavelength ranges, wherein the light guided to the fluorescence image plane is suppressed in a wavelength range, which is substantially complementary to a wavelength range $EM_k$, wherein the following applies:

$$EX=(WL \setminus DM) \cup DX,$$

$$EM_k=(WL \setminus DM) \cup DM_k, \text{ and}$$

$$PM=DM,$$

and wherein
WL represents a wavelength range of white light,
DM represents emission wavelength ranges of the fluorescent dyes,
DX represents excitation wavelength ranges of the fluorescent dyes, and
$DM_k$ represents an emission wavelength range of the k-th fluorescent dye of the fluorescent dyes.

6. A microscopy system for recording a white-light image and a fluorescence image, the microscopy system comprising:

an illumination apparatus configured to produce illumination light in an illumination light wavelength range EX and to direct the illumination light onto an object region to simultaneously excite a plurality of fluorescent dyes arranged in the object region;

a first image detection unit including:
a first fluorescence image detector,
a first white-light image detector, and
a first beam splitter; and an optical unit configured to produce an observation beam path that images the object region onto the first fluorescence image detector and onto the first white-light image detector;

wherein either the beam splitter of the respective image detection unit is a dichroic beam splitter, and wherein the dichroic beam splitter is configured to output light of a wavelength range PM to the fluorescence image detector of the respective image detection unit and to output light of a wavelength range, substantially complementary to the wavelength range PM, to the white-light image detector of the respective image detection unit, or the beam splitter of the respective image detection unit is configured to output light of substantially the same wavelength range to the fluorescence image detector and the white-light image detector of the respective image detection unit; and wherein each of the image detection units further comprises an adjustment filter that is arranged in the observation beam path between the beam splitter and the fluorescence image detector of the respective image detection unit, and that is configured to transmit light of the wavelength range PM and to suppress light outside of the wavelength range PM;

wherein the microscopy system further comprises at least one observation filter that is arrangeable in the observation beam path between the object region and the beam splitter of the respective image detection unit, and that is configured to transmit light of the wavelength range EM and to suppress light outside of the wavelength range EM; and wherein, for detecting the plurality of different fluorescent dyes arranged in the object region, the following applies:

$$EX = (WL \backslash DM) \cup DX,$$

$$EM = WL \cup DM, \text{ and}$$

$$PM = DM,$$

wherein
WL represents a wavelength range of white light,
DM represents emission wavelength ranges of the fluorescent dyes, and
DX represents excitation wavelength ranges of the fluorescent dyes.

7. The microscopy system according to claim 6,
wherein the illumination apparatus comprises a light source configured to produce the illumination light in the illumination light wavelength range EX; or
wherein the illumination apparatus comprises the light source and at least one illumination filter for producing the illumination light, the at least one illumination filter being configured to transmit light of the illumination light wavelength range EX and to suppress light outside of the illumination light wavelength range EX.

8. The microscopy system according to claim 7,
wherein each of the image detection units further comprises at least one white-light filter that is arranged in the observation beam path between the beam splitter and the white-light image detector of the respective image detection unit, and is configured to transmit light of a wavelength range of white light and to suppress light outside of the wavelength range of white light.

9. The microscopy system according to claim 8,
wherein the first fluorescence image detector, the first white-light image detector, and the first beam splitter are contained together in a first housing,
wherein the optical unit is contained in an optical unit housing, and
wherein the first housing is connectable to the optical unit housing.

10. The microscopy system according to claim 9, further comprising:
a second image detection unit including:
a second fluorescence image detector;
a second white-light image detector; and
a second beam splitter;
wherein the optical unit produces the observation beam path such that the observation beam path images the object region onto the second fluorescence image detector and onto the second white-light image detector,
wherein the second fluorescence image detector, the second white-light image detector, and the second beam splitter are contained together in a second housing, and
wherein the second housing is connectable to the optical unit housing.

11. The microscopy system according to claim 6,
wherein the first fluorescence image detector is contained in a first fluorescence image detector housing,
wherein the first white-light image detector is contained in a first white-light image detector housing,
wherein the optical unit and the first beam splitter are contained in the optical unit housing, and
wherein the first fluorescence image detector housing and the first white-light image detector housing are connectable to the optical unit housing such that the optical unit images the object region onto the first fluorescence image detector and onto the first white-light image detector.

12. The microscopy system according to claim 11, further comprising:
a second image detection unit that includes:
a second fluorescence image detector;
a second white-light image detector; and
a second beam splitter;
wherein the second fluorescence image detector is contained in a second fluorescence image detector housing,
wherein the second white-light image detector is contained in a second white-light image detector housing,
wherein the optical unit produces the observation beam path such that the observation beam path images the object region onto the second fluorescence image detector and onto the second white-light image detector, and
wherein the second fluorescence image detector housing and the second white-light image detector housing are connectable to the optical unit housing.

13. The microscopy system according to claim 6,
wherein each of the image detection units further comprises an adjustment filter that is arranged in the observation beam path between the beam splitter and the fluorescence image detector of the respective image detection unit, and is configured to transmit light of the wavelength range PM and to suppress light outside of the wavelength range PM.

14. The microscopy system according to claim 6 for detecting protoporphyrin IX (PPIX),
    wherein the illumination light wavelength range EX comprises the wavelength range from 400 nm to a first wavelength,
    wherein the wavelength range PM comprises the wavelength range from the first wavelength to 900 nm, and
    wherein the first wavelength lies in the range from 630 nm to 700 nm.

15. The microscopy system according to claim 6 for detecting indocyanine green (ICG),
    wherein the illumination light wavelength range EX comprises the wavelength range from 400 nm to 800 nm,
    wherein the wavelength range PM comprises the wavelength range from a first wavelength to 900 nm,
    wherein the wavelength range EM comprises the wavelength ranges from 400 nm to the first wavelength and from 800 nm to 900 nm, and
    wherein the first wavelength lies in the range from 630 nm to 700 nm.

16. The microscopy system according to claim 6 for detecting ICG,
    wherein the illumination light wavelength range EX comprises the wavelength range from 400 nm to 800 nm,
    wherein the wavelength range PM comprises the wavelength range from a first wavelength to 900 nm,
    wherein the wavelength range PM comprises the wavelength range from 800 nm to 900 nm, and
    wherein the first wavelength lies in the range from 630 nm to 700 nm.

17. A microscopy system for recording a white-light image and a fluorescence image, the microscopy system comprising:
    an illumination apparatus configured to produce illumination light in an illumination light wavelength range EX and to direct the illumination light onto an object region to simultaneously excite a plurality of fluorescent dyes arranged in the object region;
    a first image detection unit including:
    a first fluorescence image detector,
    a first white-light image detector, and
    a first beam splitter; and
    an optical unit configured to produce an observation beam path that images the object region onto the first fluorescence image detector and onto the first white-light image detector;

wherein either the beam splitter of the respective image detection unit is a dichroic beam splitter, and wherein the dichroic beam splitter is configured to output light of a wavelength range PM to the fluorescence image detector of the respective image detection unit and to output light of a wavelength range, substantially complementary to the wavelength range PM, to the white-light image detector of the respective image detection unit, or the beam splitter of the respective image detection unit is configured to output light of substantially the same wavelength range to the fluorescence image detector and the white-light image detector of the respective image detection unit; and wherein each of the image detection units further comprises an adjustment filter that is arranged in the observation beam path between the beam splitter and the fluorescence image detector of the respective image detection unit, and that is configured to transmit light of the wavelength range PM and to suppress light outside of the wavelength range PM;

wherein the microscopy system comprises a plurality of observation filters and the microscopy system is configured to arrange one of the observation filters in the observation beam path, wherein respectively one of the observation filters is configured to transmit light of respectively one wavelength range $EM_k$ and to suppress light outside of the wavelength range $EM_k$, and wherein, for detecting the plurality of different fluorescent dyes arranged in the object region (11), the following applies:

$$EX=(WL\backslash DM)\cup DX,$$

$$EM_k=(WL\backslash DM)\cup DM_k, \text{ and}$$

$$PM=DM,$$

wherein
WL represents a wavelength range of white light,
DM represents emission wavelength ranges of the fluorescent dyes,
DX represents excitation wavelength ranges of the fluorescent dyes, and
$DM_k$ represents an emission wavelength range of the k-th fluorescent dye of the fluorescent dyes.

* * * * *